Nov. 14, 1939.  J. CARROLL  2,180,276

FLASHLIGHT ATTACHMENT FOR CAMERAS

Filed Sept. 8, 1937    2 Sheets-Sheet 1

Inventor
Jack Carroll.

By Clarence A. O'Brien
Hyman Berman
Attorneys

Nov. 14, 1939.   J. CARROLL   2,180,276
FLASHLIGHT ATTACHMENT FOR CAMERAS
Filed Sept. 8, 1937   2 Sheets-Sheet 2
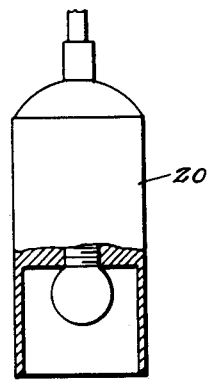
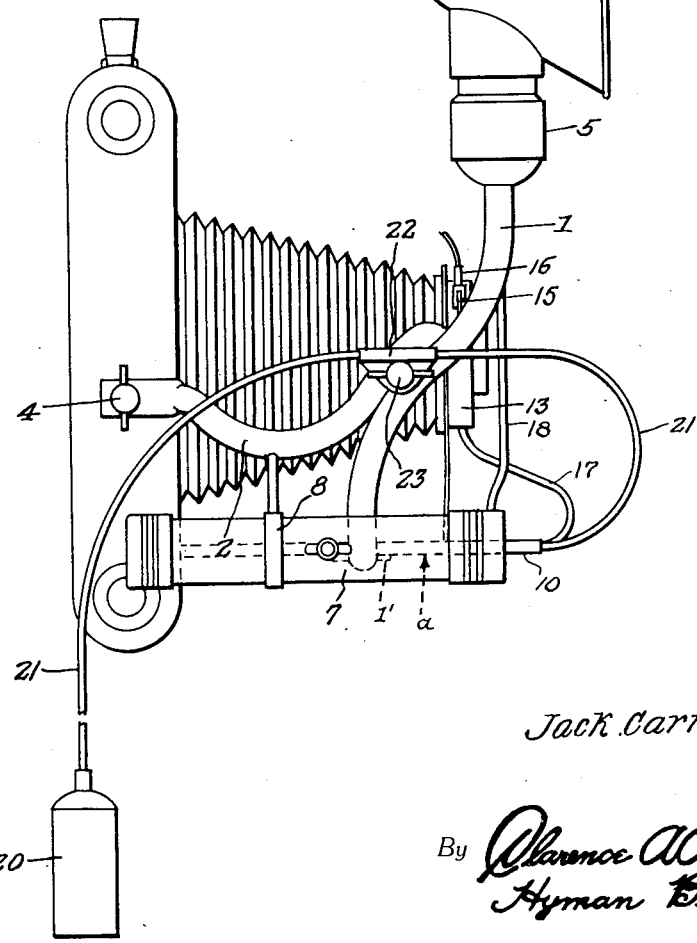
Inventor
Jack Carroll,
By Clarence A. O'Brien
Hyman Berman
Attorneys Patented Nov. 14, 1939

2,180,276

UNITED STATES PATENT OFFICE 2,180,276

FLASHLIGHT ATTACHMENT FOR CAMERAS

Jack Carroll, Rock Hill, S. C.

Application September 8, 1937, Serial No. 162,929

1 Claim. (Cl. 67—29)

This invention relates to a flashlight attachment for a camera, the general object of the invention being to provide means for connecting a bulb holder and reflector to the camera, with means for closing a circuit to the bulb when the shutter is open so that the flash will occur while the shutter is in open position, thus the subject will be illuminated and the picture taken.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 2 is a side view of Figure 1.

Figure 4 is a view partly in section of the auxiliary illuminating device.

Figure 1:
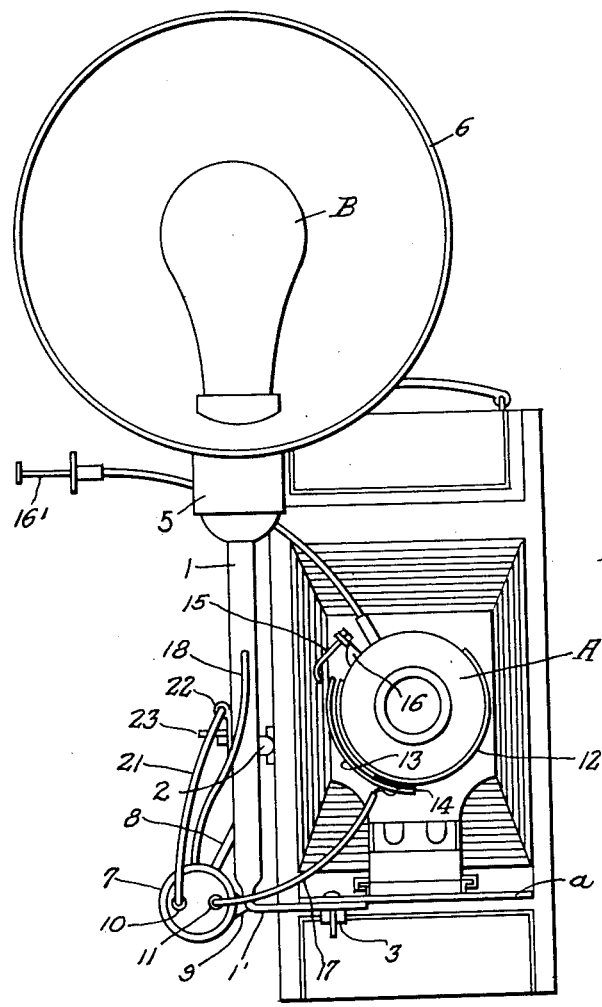
Figure 1 is a front view of a camera showing the invention applied thereto.

In these drawings the numeral 1 indicates a tubular part of a frame which includes the rearwardly extending part 2 which is fastened at its front end to the intermediate part of the portion 1 and said portion 1 has a flat right angular extension 1' which is adapted to be connected to the platform a or hinged member of the camera by the winged bolt 3. The rear end of the part 2 is connected by the winged bolt 4 with the body of the camera, these bolts engaging the holes which are provided for receiving a bolt for connecting the camera to a tripod. A socket member 5 is connected with the upper end of the part 1 of the frame and is adapted to receive the usual flash bulb B as shown in Figure 1, and the socket member also supports the reflector 6 for the bulb. A casing 7 is suitably connected with the frame, as shown at 8 and 9 and contains batteries and the front end of the casing is provided with a pair of sockets for receiving the plugs 10 and 11. An ordinary flashlight casing and its batteries may be used as this member 7, the front end being changed to receive the plugs 10 and 11.

A spring arcuate-shaped band 12 is adapted to be pressed over the barrel A of the camera which carries the shutter and associate parts and a spring contact strip 13 is carried by the band 12 but the strip is insulated from the band as shown at 14. A prong 15 is carried by the shutter release lever 16 of the camera and these parts are so arranged that as the lever 16 is moved to a position to open the shutter the prong 15 will engage the contact strip 13. When the lever goes back to its normal position the prong will be out of engagement with the strip.

Figure 3:
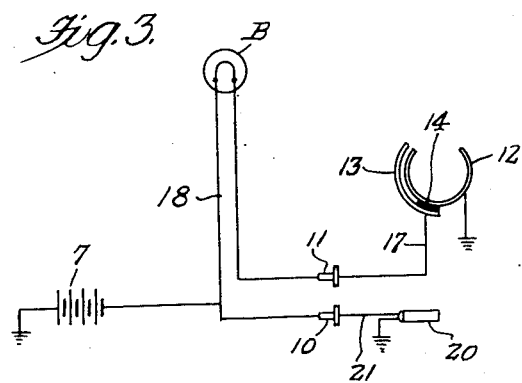
Figure 3 is a view of the circuit.

A conductor 17 connects the strip 13 with the plug 11 and a conductor 18 connects the bulb B with the battery, the parts being grounded as shown in Figure 3.

Thus it will be seen that when the shutter release lever is operated either by hand or by the bulb release shown at 16', to release the shutter so that the same will move to open position, the prong 15 will engage the strip 13 and thus the circuit to the lamp bulb B will be completed and the subject will be illuminated by the ignition of the bulb as the shutter is in open position so that a picture of the subject will be taken.

I also provide a small electric lamp 20, shown in detail in Figure 4, as such lamp is connected by a conductor 21 with the plug 10. The conductor is carried by a bracket 22 which is fastened by a thumb screw 23 to a part of the frame so that the conductor can be readily removed when the lamp is not to be used by unloosening the screw 23 and pulling the plug 10 from the socket. As soon as the plug is placed in the socket current will be supplied to the lamp as the screw 23 grounds the negative conductor of lamp 20 to the frame of the device which in turn is grounded on the camera.

This small lamp can be used whenever a lamp is needed for manipulating the parts of the camera or of the invention.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention, what is claimed as new is:

In combination with a camera having a lens barrel, a shutter mechanism carried by the barrel and an operating lever for the shutter, of circuit closing means including a spring band of arcuate shape frictionally fitting around a part of the barrel, a spring strip of arcuate shape having one end connected with the band and insulated therefrom and the rest of the strip being spaced from the band, a prong connected with the operating lever of the shutter and pressing a free end of the strip against the band when the lever is moved to open the shutter.

JACK CARROLL.